United States Patent [19]

Jones

[11] Patent Number: 4,519,827

[45] Date of Patent: May 28, 1985

[54] CONTROLLING THE TEMPERATURE OF A GLASS MOULD

[75] Inventor: Stanley P. Jones, Tickhill, England

[73] Assignee: Emhart Industries, Inc., Farmington, Conn.

[21] Appl. No.: 584,026

[22] Filed: Feb. 27, 1984

[51] Int. Cl.³ .............................................. C03B 9/38
[52] U.S. Cl. .......................................... 65/29; 65/83; 65/162; 65/356
[58] Field of Search ................... 65/265, 83, 267, 319, 65/356, 29, 162; 136/213, 236.1, 239

[56] References Cited

U.S. PATENT DOCUMENTS

| | | | |
|---|---|---|---|
| 1,232,408 | 7/1917 | Thwing | 136/213 |
| 3,666,433 | 5/1972 | Nebelung et al. | 65/162 X |
| 3,810,747 | 5/1974 | Bork | 65/356 X |
| 4,185,982 | 1/1980 | Schwenninger | 65/162 X |

FOREIGN PATENT DOCUMENTS

| | | | |
|---|---|---|---|
| WO82/02881 | 9/1982 | PCT Int'l Appl. | 65/162 |
| 397343 | 1/1974 | U.S.S.R. | 65/162 |

Primary Examiner—Arthur Kellogg
Attorney, Agent, or Firm—Arthur B. Moore

[57] ABSTRACT

During the manufacture of moulded articles, the temperature of the mould is detected and this information is used to control the operation of mould heating or cooling means. The temperature is detected by forming a passage in a mould portion which extends to an external surface, inserting an infra-red radiation transmitting device into the passage, and mounting an infra-red radiation detecting device so that it can receive radiation transmitted by the transmitting device when the mould portion is stationary.

8 Claims, 4 Drawing Figures

U.S. Patent    May 28, 1985    4,519,827
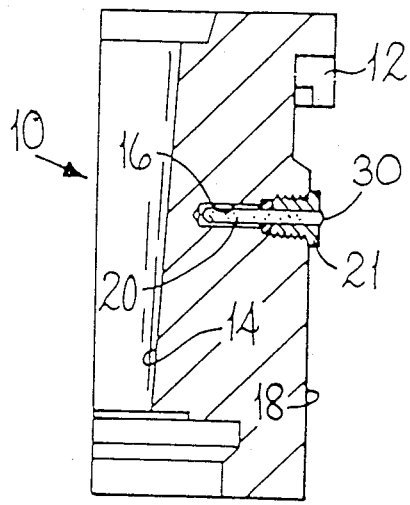
Fig_1
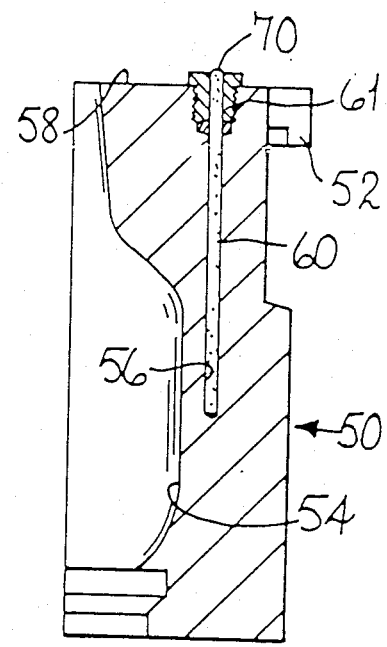
Fig_3
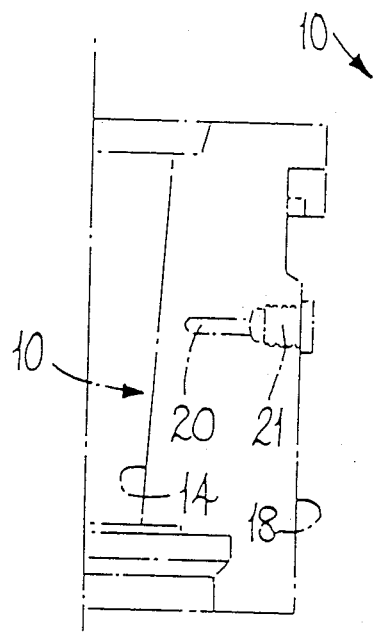
Fig_2a
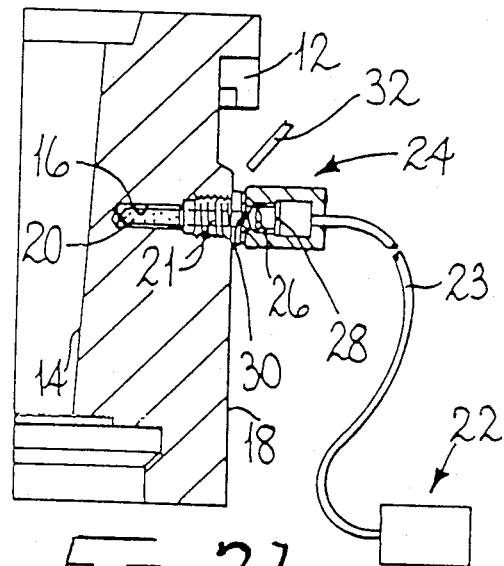
Fig_2b

1

CONTROLLING THE TEMPERATURE OF A GLASS MOULD

BACKGROUND OF THE INVENTION

This invention is concerned with a method of controlling the temperature of a mould during the manufacture of moulded articles wherein a portion of the mould is moved between a mould open position thereof and a mould closed position thereof.

In the manufacture of many moulded articles, it is necessary to control the temperature of the mould used. For example, in the manufacture of glassware containers, the mould must be maintained in a specific temperature range to enable satisfactory articles to be produced. To achieve this the mould is cooled during a portion of each moulding cycle, the duration of this cooling being determined by an operator and adjusted in accordance with the quality of the articles produced. It has long been recognised that operator control of the mould temperature controlling means is undesirable because it is dependent on the skill of the operator and, in any case, causes delays as the need for an adjustment may take some time to become apparent. Attempts have, therefore, been made to provide better control by measuring the mould temperature automatically and either automatically controlling the cooling means or displaying the temperature so that the operator can adjust the cooling means in response to temperature changes. These attempts have, however, not been fully successful because of difficulties in obtaining the temperature of the mould. If electrical temperature reading apparatus is embedded in a mould portion, the connections thereto are subject to damage and the readings are affected by electrical noise created by the mould movements. Furthermore, temperature readings based on infra-red radiation received from the outside of the mould are subject to interference from reflected radiation and are difficult to measure because of the low levels of radiation available.

This invention has the object of providing a method of controlling the temperature of a mould in which the temperature of the mould is senses reliably and accurately.

BRIEF SUMMARY OF THE INVENTION

The invention provides a method of controlling the temperature of a mould during the manufacture of moulded articles wherein a portion of the mould is moved between a mould open position thereof and a mould closed position thereof, characterised in that the method comprises forming a passage in the mould portion which extends from an external surface of the portion to a position adjacent a mould cavity defining surface of the portion, inserting an infra-red radiation transmitting device into the passage so that the device can transmit infra-red radiation along the passage to the external surface of the portion, mounting an infra-red radiation detecting device so that, when the mould portion is stationary, it can receive infra-red radiation transmitted to the external surface of the portion by the transmitting device, and operating mould heating or mould cooling means in accordance with whether the radiation detected by the detecting device indicates that the mould temperature is too high or too low.

In a method according to the last preceding paragraph, the mould portion does not contain an electrical device so that there are no problems concerning damage to connections or electrical noise. Furthermore, the infra-red radiation used for determining the temperature of the mould originates from the interior of the mould portion and hence is not subject to interference from reflected radiation and, because higher temperatures are involved, far more radiation is available. Thus, the method gives a more accurate impression of the mould cavity temperature than if infra-red radiation received from the outer surface of the mould portion were to be used for this purpose.

Where side portions of the mould portion are not readily accessible, advantageously the passage extends longitudinally of the mould portion parallel to a longitudinal axis of the mould cavity.

Where the transmitting device is a silica or glass rod, improved accuracy may be obtained if the end of the rod which is at the external surface of the mould portion is rounded to form a lens which concentrates the infra-red radiation.

Where the transmitting device is a silica or glass rod or a bundle of glass or silica fibres, the transmitting device may advantageously be kept clean by blowing cleaning air on to the end of the transmitting device at the external surface of the mould portion when the mould portion is stationary in either its mould open or its mould closed position.

The transmitting device may alternatively be an aluminium tube which has the advantage of not being susceptible to dirt covering its external end.

BRIEF DESCRIPTION OF THE DRAWINGS

There now follows a detailed description to be read with reference to the accompanying drawings of two methods of controlling the temperature of a mould which are illustrative of the invention. It is to be understood that the illustrative methods have been selected for description by way of example and not of limitation of the invention.

In the drawings:

FIG. 1 is a longitudinal cross-sectional view of a mould portion used in the first illustrative method;

FIG. 2A is a longitudinal cross-sectional view of the mould portion of FIG. 1, shown in phantom in its mould closed position;

FIG. 2B is a longitudinal cross-sectional view of the mould portion of FIG. 1, shown in its mould-open position; and FIG. 3 is a similar view to FIG. 1 but of a mould portion used in the second illustrative method.

DETAILED DESCRIPTION OF PREFERRED EMBODIMENT OF THE INVENTION

The first illustrative method is a method of controlling the temperature of a mould during the manufacture of moulded articles. The mould comprises two side portions, one (10) of which is shown if FIGS. 1 and 2. Each of the two side portions comprises a hook portion 12 by which it is supported by moving means (not shown) which is operable to move the mould portions between a mould open position thereof and a mould closed position thereof in which mould cavity defining surfaces 14 of the mould portions co-operate to define a mould cavity. The mould portion 10 is shown in its mould open position in FIG. 2B with its mould closed postion being shown in broken line in FIG. 2A.

The first illustrative method comprises forming a horizontal passage 16 in the mould portion 10 which extends from an external surface 18 of the portion 10 to a position adjacent the mould cavity defining surface 14 of the portion 10. The passage 16 does not extend to the surface 14 so that material is prevented from passing from the mould cavity into the passage 16. The passage 16 is formed by boring so that it is of circular cross-section.

The first illustrative method also comprises inserting an infra-red transmitting device 20, comprising a silica rod of substantially the same length as the passage 16 and of slightly smaller diameter, into the passage 16 so that the device 20 can transmit infra-red radiation along the passage 16 to the external surface 18. Thus, infra-red radiatioh originating from adjacent the mould cavity is transmitted to the surface 18. The device 20 is held in position in the passage 16 by a fitment 21 which is threadedly received in a recess in the surface 18 surrounding the passage 16, the silica rod passing through the fitment 21 but being gripped thereby.

Next, in the first illustrative method, an infra-red detecting device 22 is mounted so that, when the mould portion (FIG. 2B) is stationary in its mould open position, the device 22 can receive infra-red radiation transmitted to the external surface 18 by the transmitting device 20. The detecting device 22 is connected by a fibre optic guide 23 to a head 24 which is mounted close to the external surface 18 when the portion 10 is in its mould open position. The head 24 comprises a lens 26 and a filter 28 and acts to pass radiation into the guide 23 by which it is transmitted to the device 22. The device 22 is connected to control means (not shown) of a machine in which the mould portion 10 is mounted and the control means operates mould heating or cooling means in accordance with whether the radiation detected by the detecting device 22 indicates that the mould temperature is too high or too low.

In the first illustrative method, the end 30 of the silica rod comprising the transmitting device 20 which is at the external surface 18 is rounded to form a lens which concentrates the infra-red radiation. This increases the accuracy of the method by ensuring that more radiation reaches the detecting device 22. Such a rounded end may also be employed in a modification of the first illustrative method in which the silica rod is replaced by a glass rod.

Also in the first illustrative method, the end 30 of the silica rod is cleaned automatically as the mould portion 10 is moved away from its mould closed position. This is achieved by cleaning air which is blown through a tube 32 on to the end 30. This prevents dirt or dust from adhering to the end 30 and obstructing transmission of infra-red radiation. Such cleaning can be applied in modifications of the first illustrative method in which the silica rod is replaced by a glass rod or a bundle of silica or glass fibres. Such cleaning is, however, unnecessary in a further modification of the first illustrative method in which the silica rod is replaced by an aluminium tube.

The second illustrative method is identical to the first illustrative method except that a mould side portion 50 is employed (see FIG. 3) and the silica rod forming the transmitting device 60 is in a vertical passage 56. The silica rod has a rounded top end 70 forming a lens and is held in position by a fitment 61. The passage 56 extends from an upper external surface 58 of the portion 50 to a position adjacent a mould cavity defining surface 54 of the portion 50. Thus, the passage 60 extends longitudinally of the portion 50 parallel to a longitudinal axis of the mould cavity. The portion 50 has a hook portion 52 by which it is supported and, when the portion 50 is in its mould open position or its mould closed position, infra-red radiation is transmitted from the transmitting device 60, via a head (not shown) similar to the head 24, to a detecting device (not shown) similar to the detecting device 22.

I claim:

1. A method of controlling the temperature of a mould during the manufacture of moulded articles wherein a portion of the mould is moved between a mould open position thereof and a mould closed position thereof, wherein the method comprises forming a passage in the mould portion which extends from an external surface of the portion to a position adjacent a mould cavity defining surface of the portion, inserting an infra-red radiation transmitting device into the passage so that the device can transmit infra-red radiation along the passage to the external surface of the portion, mounting an infra-red radiation detecting device so that, when the mould portion is stationary, it can receive infra-red radiation transmitted to the external surface of the portion by the transmitting device and operating mould heating or mould cooling means in accordance with whether the radiation detected by the detecting device indicates that the mould temperature is too high or too low.

2. A method according to claim 1, wherein the passage extends longitudinally of mould portion parallel to a longitudinal axis of the mould cavity.

3. A method according to either one of claims 1 and 2, the infra-red transmitting device is a silica rod.

4. A method according to either one of claims 1 and 2, the infra-red transmitting device is a glass rod.

5. A method according to either one of claims 1 and 2, wherein the infra-red transmitting device is a glass or silica rod and the end of the rod which is at the external surface of the mould portion is rounded to form a lens which concentrates the infra-red radiation.

6. A method according to either one of claims 1 and 2 wherein the infra-red transmitting device is a bundle of glass or silica fibres.

7. A method according claim 1 wherein the infra-red transmitting device is a glass or silica rod and cleaning air is blown on to the end of the transmitting device at the external surface of the mould portion.

8. A method according to either one of claims 1 and 2, wherein the infra-red transmitting device is an aluminium tube.

* * * * *